United States Patent [19]

Tamai et al.

[11] Patent Number: 4,520,661
[45] Date of Patent: Jun. 4, 1985

[54] TEMPERATURE AND WEAR SENSOR FOR A BRAKE

[75] Inventors: Takashi Tamai, Hirakata; Shigefumi Tomiyama, Higashiosaka; Nobumasa Ohshima, Hirakata, all of Japan

[73] Assignee: Matsushita Electric Industrial Co., Ltd., Kadoma, Japan

[21] Appl. No.: 497,582

[22] Filed: May 24, 1983

[51] Int. Cl.³ .................................................. G01L 5/28
[52] U.S. Cl. ......................................... 73/129; 374/148
[58] Field of Search .................. 73/129, 121; 374/148; 188/1.11

[56] References Cited

U.S. PATENT DOCUMENTS 3,975,706  8/1976  Kato ................................. 73/129 X

FOREIGN PATENT DOCUMENTS

| 57135302 | 8/1962 | Japan . |
| 57135933 | 8/1962 | Japan . |
| 119237 | 9/1980 | Japan .................................. 188/1.11 |
| 55-43297 | 10/1980 | Japan . |

Primary Examiner—Jerry W. Myracle
Attorney, Agent, or Firm—Cushman, Darby & Cushman

[57] ABSTRACT

A temperature and wear sensor for a brake is fixed disposed in a brake cylinder, and the sensor has a slider to be pressed on the side face of a piston of the brake cylinder and a temperature sensing device; thereby wear out of brake lining and overheating of the brake fluid are detected through a pair of lead out wires, and the sensor can be used permanently.

12 Claims, 8 Drawing Figures

TEMPERATURE AND WEAR SENSOR FOR A BRAKE

BACKGROUND OF THE INVENTION

1. Field of the Invention

The present invention relates to a sensor for wearing of brake as well as temperature thereof.

2. Description of the Prior Art

FIG. 1 shows configuration of the conventional wear sensor for a brake in sectional view and FIG. 2 shows detail of the sensor in an enlarged sectional view. As shown in FIG. 1, brake lining 1a and 1b are mounted on lining holder 2a and 2b, respectively in a frame 3'. The frame 3' has a piston 4, and a cylinder 3 containing the piston 4 is fixed to the lining holder 2a and pushes the lining 1a (the lining 1a and the holder 2a form a shoe) towards a rotor disc 6 when amount of brake fluid 5 increases in the cylinder 3 by means of known brake operation. Therefore, both surfaces of the rotor disc 6 are pinched between the brake lining 1a and 1b, respectively, thereby the rotation of the rotor disc 6 is braked by means of frictions between the faces of the rotor disc and the brake linings 1a and 1b. In the conventional brake wear sensor, a sensor 7 is provided buried in the brake lining 1a in a manner that when the brake lining 1a wears to a predetermined position, tip of the sensor 7 becomes exposed and further wears out together with the brake lining 1a thereby making some change on the sensor.

Detail of one conventional example is shown in FIG. 2 wherein the sensor 7 comprises metal wire 8 of lateral V-letter shape buried in an insulator case 9, and both ends of wires are led out by means of lead wires 10. The end tip of the V-shaped metal wire 8 is disposed at a predetermined wear limit position B, at which the sensor should make a signal. Therefore, when the brake lining 1a goes on wearing, from an initial position A to the wear limit position B, the end tip of the metal wire 8 is cut out as the brake lining wears. According, the resistance between the lead wires 10, 10 become indinite from almost 0Ω, thereby making a known subsequent circuit issue a worn out sensing signal.

The above-mentioned conventional wear sensor for a brake can sense only wearing of the brake lining, and as another problem, the sensor is unrestorably destroyed namely cut off with respect to the metal wire 8. Accordingly, the sensor 7 must be thrown away together with removal and thrown away of the worn brake lining 1a.

On the other hand, in recent years as automatic transmission becomes popular, when a novice driver continously uses foot brake, dangerous vapor locking of the brake system is liable to occur. This is because of undue temperature rise of brake fluid the brake fluid vaporises and generates foams in the brake fluid. In order to prevent such very dangerous vapor locking of a brake system, a sensor for detecting undue temperature rise of the brake fluid is recently waited for.

SUMMARY OF THE INVENTION

The present invention purposes to provide a temperature and wear sensor for a brake.

This invention also enables repeated uses of the temperature and wear sensor for a brake by employing a novel configuration of the sensor.

A temperature and wear sensor for a brake comprising:

a composite position and temperature sensor disposed at a predetermined position of the brake cylinder, for detecting position changes of piston in a brake cylinder, thereby to detect wearing of a brake lining and for detecting temperature of brake fluid in the brake cylinder through thermal conduction to a body of the sensor.

DESCRIPTION OF THE PREFERRED EMBODIMENTS

Figure 1:
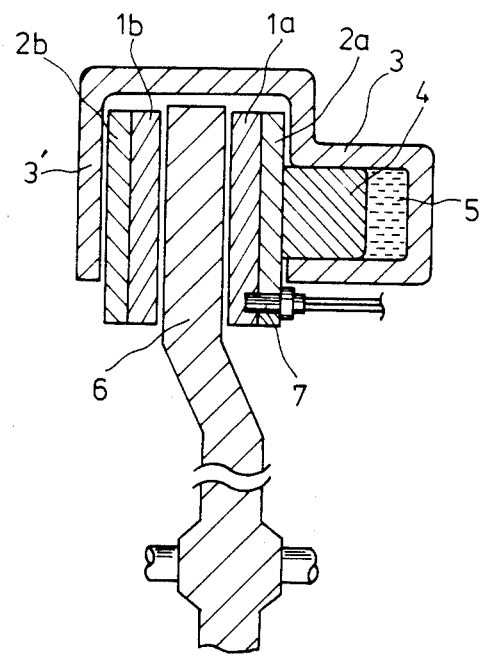
FIG. 1 is the sectional view of the conventional wear sensor for brake.
Figure 2:
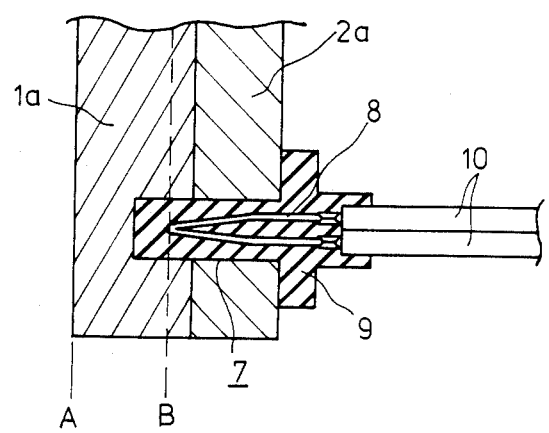
FIG. 2 is the enlarged sectional view showing in detail of principal part of the apparatus of FIG. 1.
Figure 3:
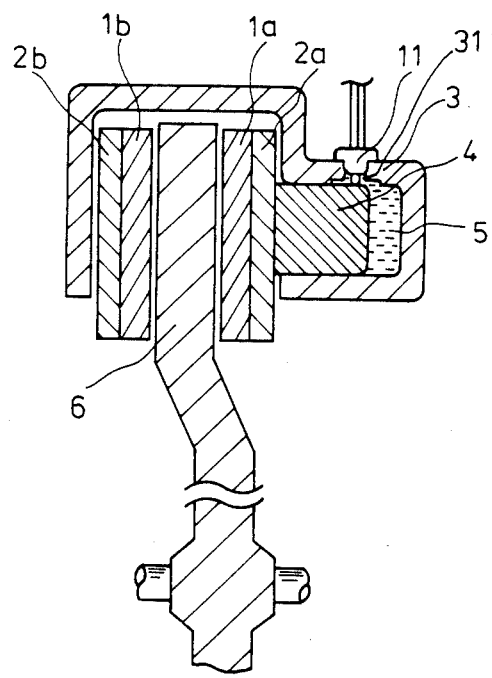
FIG. 3 is a sectional view of a temperature and wear sensor for a brake in accordance with the present invention.
Figure 4:
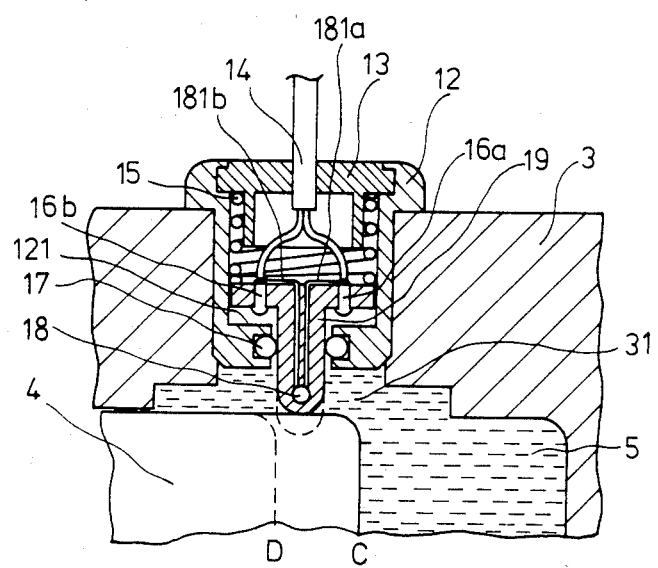
FIG. 4 is an enlarged sectional view showing principal part in section of the apparatus of FIG. 3.

The best mode of the present invention is elucidated with reference to FIG. 3 and subsequent figures which show preferred embodiments in accordance with the present invention. FIG. 3 and FIG. 4 show first embodiment wherein a temperature and wear sensor for a brake 11 is mounted on a cylinder wall of a brake cylinder 3, other components of FIG. 3 are substantially the same as those corresponding to the apparatus of FIG. 1. The cylinder 3 has a hollow 31 and the sensor 11 is disposed in a manner that the lower end part is exposed in the hollow 31 so as to be immersed in the brake fluid 5 in the hollow 31.

The detailed configuration of the sensor of FIG. 3 is shown in the enlarged sectional view of FIG. 4. The sensor 11 has, in a case 12 of a metal, a slider 19 of a rod shape having a thermistor 18 at its free end part exposed in the hollow 31. A pair of lead wires 181a and 181b and the lead wires 14 are connected to the contacts 16a and 16b. The slider 19 receives pushing down force by a coil spring 15, upper end of which is stoped by a stopper lid 13. Therefore, the slider 19 is always pushed downwards through a hole of the sensor case 12. Sliding part between the rod-shaped slider 19 and through hole of the case 12 is sealed by means of a known seal ring 17, so that the brake fluid 5 does not come into the sensor. Alternatively, the seal ring may be omitted, so that the brake fluid 5 is introduced inside the sensor case thereby to make better thermal transmission. The position of the sensor is selected such that when the brake lining 1a is from the initial stage of use to the last stage at which a worn out signal should be issued. The slider 19 is pushed upwards by a side face of the piston 4, and when the brake lining 1a and 1b wear passing the predetermined line and the piston 4 goes left side, the slider slips off from the shoulder of the piston 4.

Operation of the apparatus of FIG. 3 and FIG. 4 is as follows: When the brake lining 1a is from the initial state of use to the state immediately before the predetermined worn out position, the rear end of the piston 4 is at right hand with respect to the position of the slider 19, so that the slider 19 is held upwards by the side face of the piston 4. Therefore, the contacts 16a and 16b is parting from the bottom face 121 of the case 12, and therefore the contacts 16a and 16b are not short-circuited by the bottom face 121. At this time, the resistance of the thermistor 18 can be measured through the lead wires 14 from outside by means of a known circuit, therefore the temperature of the brake fluid 5 is measured by the thermistor 18 in the slider tip. Then as the brake lining 1a and 1b wears, the piston 4 moves leftwards and the rear end moves the position C shown in FIG. 4 to the position D. Therefore, when the brake lining 1a passes the predetermined wear line, the slider 19 slips off at the rear end of the side face of the piston 4. Accordingly, the contacts 16a and 16b, fixed on the upper part of the slider 19 goes down and touch the bottom face 121, thereby short-circuiting the thermistor 18. Accordingly, by means this short-circuiting of the thermistor, the wearing to a predetermined position of the lining 1a is detected. That is to say, the sensor in accordance with the present invention can measure the temperature of the brake fluid by the thermistor 18, and also by a short-circuiting of the thermistor, the worn out to a predetermined position of the brake lining is detectable.

Figure 5:
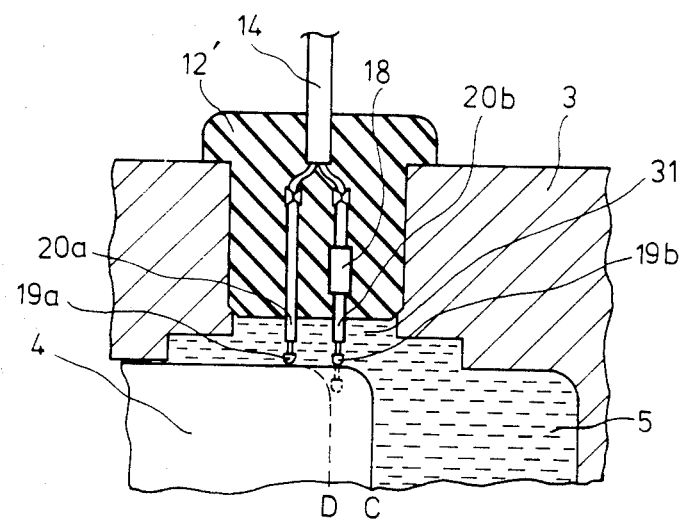
FIG. 5 is an enlarged sectional view showing principal part of another embodiment.

FIG. 5 shows the another example wherein correponding parts are designaed by the same numerals to the preceding figures. In this example a pair of sliders 19a and 19b are provided with a short distance apart in a direction of piston 4 movement. Both sliders 19a and 19b are held at the lower end of a spring header pins 20a and 20b. One slider, for instance 19a is connected directly to a wire of the lead out wires 14 and the other slider 19b is connected through a thermistor 18 to a wire of the lead out wires 14. The case 12' is made of insulating material and header pins 20a and 20b are almost embedded in the body of the case 12' only exposing their end tips and sliders 19a and 19b. The sliders 19a and 19b are pushed upward by the side face of the piston 4 when the brake lining is not yet worn out. Therefore, the sliders 19a and 19b are short-circuited by the side face of the piston 4, accordingly the resistance of the thermistor 18 is connected through the lead wires 14 by a known outside circuit. And measures the temperature conducting from the brake fluid through the body of the case 12' by the thermistor 18. When the brake lining becomes worn out to a predetermined thickness, the piston 4 goes leftwards from the position C to the position D as shown in FIG. 5, and when the rear end of the piston 4 comes to the position D the slider 19b slips off the side face of the piston 4, and thereafter the slider 19b departs from the piston 4 thereby opening the thermistor circuit. Accordingly, by the opening of the thermistor circuit, worn out to a predetermined thickness of the brake linings 1a and 1b are detected.

Figure 6:
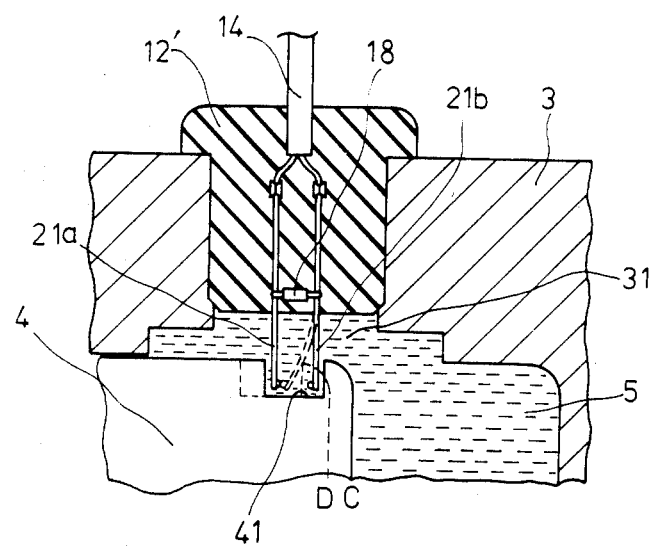
FIG. 6 is an enlarged sectional view showing principal part of another embodiment.

FIG. 6 shows still another exaple. Corresponding parts to the preceding example are designated by the same part similar numerals. In FIG. 6 a pair of resilient contact plates 21a and 21b are mounted in the body of the case 12' of insulating material and lower end parts of the resilient contact plates 21a and 21b are disposed in a recess 41 of the rear end part on the side face of the piston 4 in a manner not to touch the wall of the recess. And a thermistor 18 is connected parallelly across the pair of the contact plates 21a and 21b. Other parts are substantially the same as the apparatus of FIG. 5.

Operation of the example of FIG. 6 is as follows: At the initial stage of the brake lining 1a and 1b, the piston 4 is positioned as shown by a solid line C, and therefore the pair of contact plates 21a and 21b are disposed freely in the recess without making touch between the contact plates 21a or 21b and vertical walls of the recess 41. As the brake lining 1a and 1b wear out, the piston 4 moves leftwards and the rear end comes to a position shown by dotted line D. And at this time, the right contact plate 21b is pushed leftwards by means of right side vertical wall of the recess 41 and touches the left side contact plates 21a thereby making a touching between their contacts. Until the above-mentioned touching, the thermistor only is connected across a pair of lead wires 14, and therefore temperature of the brake fluid 5 can be measured by the resistance of the thermistor through the lead out wire by a known outside circuit. Then, when the brake lining 1a and 1b wear-out, and the piston 4 moves leftwards and makes the contact plates 21a and 21b contact each other, the thermistor 18 is short-circuited. Therefore, by means of the short-circuiting, the worn-out of the brake lining is detected.

Figure 7:
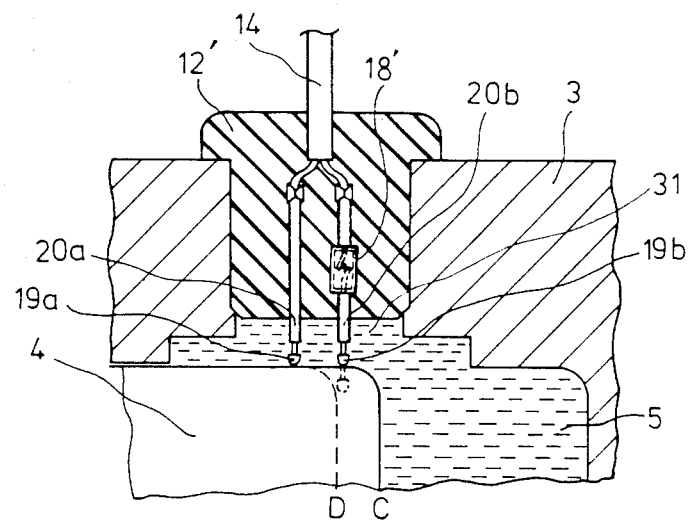
FIG. 7 is an enlarged sectional view showing principal part of another embodiment.

FIG. 7 shows still another example using a normal-ON bimetal 18' in place of the thermistor 18 of the example of FIG. 5, other parts are the same as FIG. 5. In this example, when the temperature of the brake fluid 5 rises to a predetermined temperature, the normal-ON bimetal 18' turns off thereby makes a signal of high temperature detection. Also, when the blake linings 1a and 1b are worn out, then the slider 20b slips off the rear end of the piston 4 and connection between the lead wires 14 is switched off, thereby issuing a worn out signal.

Figure 8:
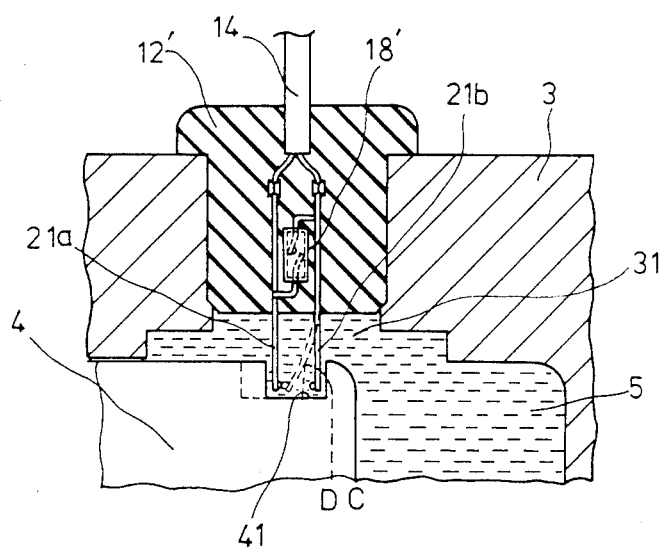
FIG. 8 is an enlarged sectional view showing principal part of another embodiment.

FIG. 8 shows anothwer example. In this example, a normal-OFF bimetal 18' is connected across a pair of the lead out wires 14 of the example of FIG. 6. Other parts are substantially the same as those of FIG. 6. In this example, when temperature of the brake fluid 5 rises to a predetermined temperature, the normal OFF bimetal turns on, thereby issuing ON signal as a high temperature signal through the pair of wires. And when the brakes 1a and 1b are worn out, then ON signal as worn out signal is issued also through the pair of wires 14. These ON signals are distinguishable between the high temperature signal or the worn out signal by considering the condition that the high temperature signal generally becomes extinguished by non-use of the brake for a certain time, while the worn out signal is not restored by the non-use.

In the above-mentioned examples, the thermistor 18 can be replaced by a platinum temperature measuring resistor or by thermocouple.

The sensor for temperature and wear detection in accordance with the present invention can detect the high temperature of the brake fluid and also the worn out of the brake lining by a single sensor, and furthermore, the sensor 11 can be repeatedly used for long time even when the linings 1a and 1b are interchanged after worn out. Therefore, it is very economical.

What is claimed is:

1. A temperature and wear sensor for a brake having a shoe movable by a piston and cylinder against a rotating part comprising:
   a composite position and temperature sensing device engageable between the cylinder and the piston, said device including:
   means for detecting and electrically indicating predetermined changes in temperature; and
   means including switch means operable by a predetermined relative position between the cylinder and the piston for electrically indicating a predetermined wear condition of the shoe.

2. The sensor defined in claim 1 wherein the switch means includes:
a movable slider; and
means for urging said slider against the piston.

3. The sensor defined in claim 2 in which:
the switch means includes a pair of normally-open contacts carried by the slider and adapted to be closed on attainment of the predetermined relative position, and
the temperature change connecting means is connected across said contacts.

4. The sensor defined in claim 3 including:
a sensor case, and
wherein the contacts are disposed within said case and the slider has a rod-shaped part projecting through a hole in said case.

5. The sensor defined in claim 4 including:
seal means between the part and the peripheral edge of the hole.

6. The sensor defined in claim 4 wherein the case is adapted to be filled with brake fluid from the cylinder.

7. The sensor defined in claim 1 wherein the switch means includes:
a pair of electrical contacts; and
means for urging said contacts against the piston,
the temperature change detecting means being connected in series with one of said contacts.

8. The sensor defined in claim 1 wherein the switch means includes:
a pair of normally-open contacts, one engageable by the piston and moved into contact with the other on attainment of the predetermined relative position;
the temperature change connecting means being connected across said contacts.

9. The sensor defined in any one of claims 1-6 wherein the temperature change detecting means is a thermistor.

10. The sensor defined in any one of claims 1-6 wherein the temperature change detecting means is a platinum temperature measuring resistor.

11. The sensor defined in any one of claims 1-6 wherein the temperature change detecting means is a thermocouple.

12. The sensor defined in any one of claims 1-6 wherein the temperature change detecting means is a bi-metal switch.

* * * * *

UNITED STATES PATENT AND TRADEMARK OFFICE
CERTIFICATE OF CORRECTION

PATENT NO. : 4,520,661
DATED : June 4, 1985
INVENTOR(S) : TAMAI, Takashi, et al

It is certified that error appears in the above—identified patent and that said Letters Patent is hereby corrected as shown below:

Column 6, Claims 9 - 12, line 1 of each, change "6" to -- 8 --.

Signed and Sealed this

Third Day of December 1985

[SEAL]

Attest:

DONALD J. QUIGG

Attesting Officer

Commissioner of Patents and Trademarks